July 24, 1962  R. W. ANDREASSON  3,045,513
DRILL
Filed July 5, 1960
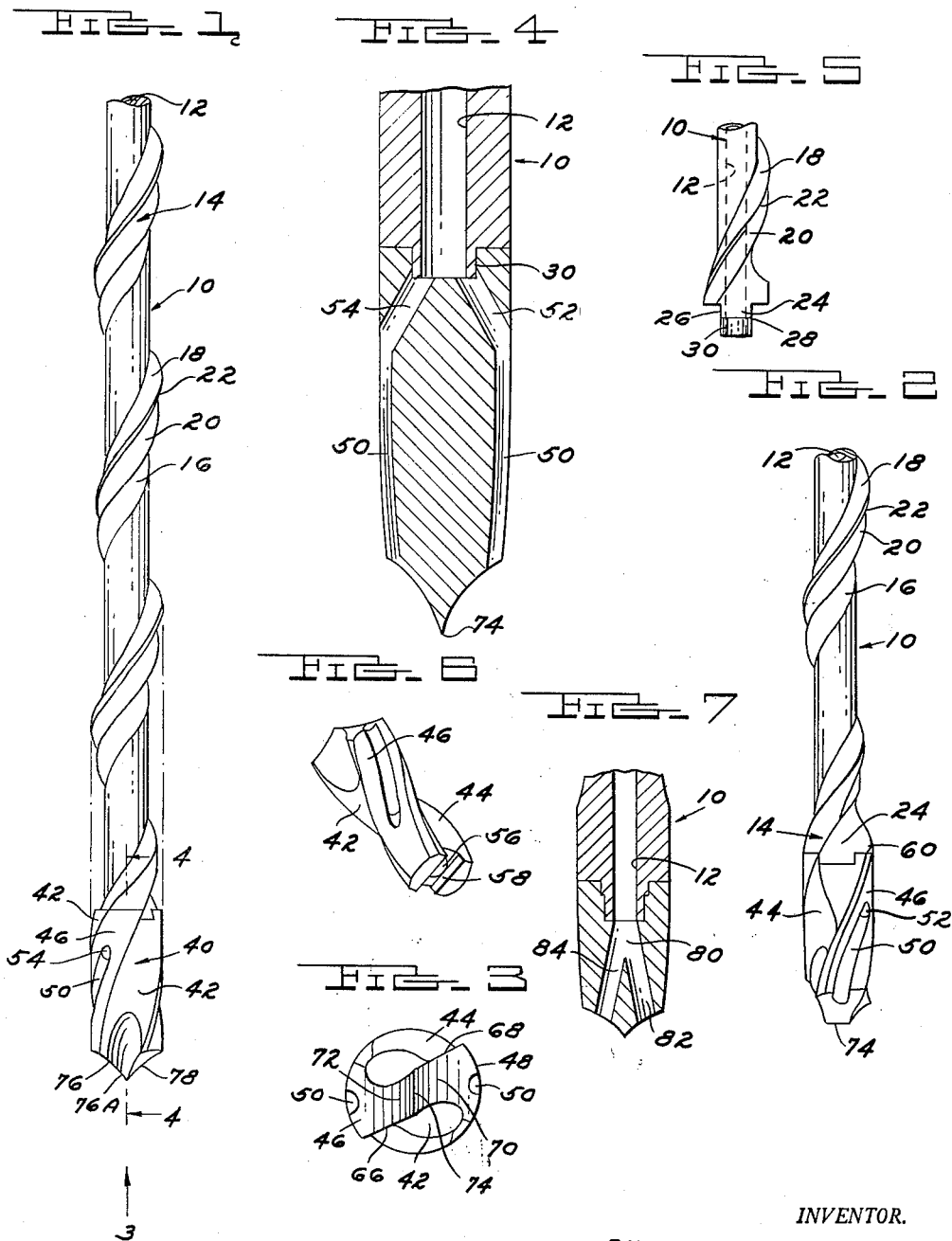
INVENTOR.
RUDOLF W. ANDREASSON
BY
Barnes, Kisselle, Raisch & Choate
ATTORNEYS 3,045,513
DRILL
Rudolf W. Andreasson, 780 W. Maple Road,
P.O. Box 174, Birmingham, Mich.
Filed July 5, 1960, Ser. No. 40,853
5 Claims. (Cl. 77—68)

This invention relates to a drill and has particularly to do with a drill, which is adapted though not limited to very fast drilling of soft materials such as aluminum, for example. Due to the fact that the material is generally soft, the drilling speed in inches per minute is usually quite a great deal higher than the drilling of steel, for example. For this reason, the chips form in much greater quantity, and it must be possible to get rid of them rapidly or there will be problems in connection with the build-up of chips which causes the chips to weld to the drill or to block up the exit passages.

The present invention contemplates a drill design which is especially adapted to this rapid feed drilling of soft materials.

At the present time, drilling of deep holes in automobile blocks is causing tremendous breakage in available production drills. It is also causing a slow up of operations due to small increment stop drilling to prevent breakage.

It is an object to provide a drill which will take a deep hole in a single stroke and due to adequate coolant flow and large chip clearance will not bind in the hole or heat up unduly.

It is also the object to provide a drill design which permits tip replacement so that a single drill shank can be utilized with different tips which can be brazed on it.

It is another object of the invention to provide a double flute tip which is combined with a single flute drill shank of the type having a single land flute which maintains the strength of the shank while increasing the chip clearance.

A further object of the invention is the utilization of a special shape of drill tip which is shaped to center in the hole and which causes the formation of chips which break readily into small chips and which will readily flow out of the flute clearance in the drill. This is accomplished by a drill design which forms different shapes of chips at different points along the cutting edge so that the chips may flow together freely out of the spiral grooves of the drill.

Other objects and features of the invention relating to the design and operation of the drill will be apparent in the following description and claims.

Drawings accompany the disclosure and the various views thereof may be briefly described as:

FIGURE 1, a side elevation of a completed drill.
FIGURE 2, a side elevation of the end of the drill showing the drill rotated 90° from the view of FIGURE 1.
FIGURE 3, an end view of the drill tip on line 3 of FIGURE 1.
FIGURE 4, a sectional view on line 4—4 of FIGURE 1.
FIGURE 5, a view of the end of the drill shank with the tip removed.
FIGURE 6, a perspective view of the drill tip showing the shank end.
FIGURE 7, a sectional view of a modified type of drill tip having internal fluid ports extending to the cutting edges.

In a drill point design, the ideal shape for a centering drill is a small included angle such as 40° or 60°, while the ideal shape for chip removal might be 180° such as an end mill since chips then move, when cut, in a true axial direction out of the hole. Most drill design is a compromise with an included angle of about 120 to 122° which provides reasonable centering and directs chips in part toward the outlet of the hole. In addition, of course, the smaller the included angle, the longer the drill cutting edge from point to side wall. This gives a longer cutting edge and removes material faster but also increases the length of the drill and the length of the unusable portion of the hole in case it is a blind hole.

In addition, a longer cutting edge which accompanies a small included angle tip causes large chips which form near the larger diameter of the drill to block the exit of smaller chips forming near the center of the drill. This is called "unloading-up" and results in overheating and breakage. Attempts to avoid this loading up have been made by cutting a shoulder below the edge of the drill to create a chip-breaker much as in a single point tool. This requires excessive grinding whenever the drill point is to be reground.

The present invention contemplates a design which combines the advantages of a low-included angle tip with a high-included angle cutting edge and additional advantages which flow from the particular combination.

The design includes a drill tip which has cutting edges lying in spaced planes parallel to the axis of the drill, each edge having a profile in a curve transverse of the drill resulting in a low-included angle at the tip but sweeping out to embrace more or less the normal flare of a standard drill.

Referring to the drawings:
In FIGURE 1, the drill shank 10 has a central opening 12 for coolant and has a single rib 14 forming a wide spiral flute on the shank. The rib itself is a wide rib which is formed upwardly from each side in sloping walls 16 and 18 to a sub-land 20 and a final contacting land 22 which is relatively narrow compared to the remainder of the entire rib and the sub-land 20.

Thus the rib adds greatly to the strength of the shank while providing a narrow contact surface and wide spacing of the rib in the steep spiral provides wide channels for the escape of chips. The end of the shank shown in FIGURE 5 has a central projection 24 which is substantially rectangular in shape with flat sides 26 and 28. Projecting downwardly from this portion of the shank is a circular projection 30 concentric with the central oil hole 12. The tip 40 for the drill shank shown in FIGURE 1 has two flutes, one flute 42 showing in FIGURE 1 and the other flute 44 showing in FIGURE 2.

Both flutes are shown in FIGURE 6. The ribs or land portions between the flutes of the drill tip, designated at 46 and 48 respectively, are each provided with a surface groove 50 which extends downwardly to the end of the ribs in the drill tip. The upper ends of these grooves are connected to passages 52 and 54 which lead to a central opening 56 which receives the cylindrical end projection 30 of the shank.

Above the opening 56 is a transverse opening 58 which receives the rectangular projection 24 of the shank in a manner that the central opening 12 of the shank is connected to each of the passages 52 and 54. One of the flutes 44 merges directly with the flute of the drill shank. The other flute 42 is also merged with the flute of the shank which has a double rib at the lower end formed by the main rib portion 14 and a small rib portion 60. Thus both flutes of the tip merge with the main flute of the shank by reason of the fact that the small rib 60 tapers immediately into the shank portion and the flute of the shank directly above the tip end of the shank.

The tip of the drill is especially designed to provide not only a self-centering action which facilitates the straight drilling, but also which creates different types of chips, each of them very small, so that there can be a steady flow up through the flute of the drill. As shown in FIGURE 3, the tip has two cutting edges 66 and 68, each lying in a plane which is parallel to the axis of the drill though spaced from it. The drilling end is backed away at 70 and 72 from the straight cutting edges and the tip edge formed at 74 is diametrical of the drill at the obtuse angle to the edges 66 and 68. The surfaces 70 and 72, however, are, in addition to being backed off from the cutting edges, also curved as shown best in FIGURE 1 at 76 and 78. The radius of this curve is preferably approximately equal to the diameter of the drill shank or tip so that the edges 66 and 68 being straight in one plane have a substantial curve in another plane or in side profile. While this curve is circular as shown, it could be acircular as long as it forms a tip with a low-included angle and sweeps out to the outer diameter to include in all about 120° angle or less.

A modified type of drill tip is shown in FIGURE 7 in which the opening 12 of the drill shank 10 connects to a passage 80 which diverges into the outside ribs of the drill tip as in FIGURE 1 but diverges less than an angle directly down to the surfaces 70 and 72 in branch passages 82 and 84.

In operation of the drill, it has been found that the shavings that form near the center of the drill, for example, at about 76A of FIGURE 1 are tightly coiled in a short spiral whereas the shavings that form in the middle and the outer edge of the cutting edges 68 and 66 are less tightly coiled but also short so that the curved edges 66 and 68 seem to cooperate with the other surfaces of the drill to act as a chip breaker so that the shavings are all short and can be readily passed upwardly through the wide flutes through the outside of the hole.

The low-included angle provides a drill which has a high degree of self-centering action but the curved cutting edge is actually longer than the straight edge and thus removes less metal per revolution with the same axial feed. Conversely the drill can be fed faster with the same chip load as a standard drill. In addition, the drill cuts a chip with a curved cross-section which is less susceptible to bending and thus breaks off to create small chips. Thus no chip breaker needs to be ground into the cutting lip and the drill can be reground frequently before tip replacement is necessary.

It has thus been found possible to drill very rapidly into a metal such as aluminum at a speed, for example, of 41 r.p.m. The drilling speed has been accomplished at 33 inches per minute. It is also desirable in the construction described that the surface land of the drill shank be harder than the central portion of the drill. For example, with SAE 4530, it has been found desirable to have a Rockwell hardness of about 45 to 48 for the central portion of the shank with a land hardness for land 22 of 62 to 65 on the Rockwell C scale. The tips are brazed into the shanks. Thus the rib reinforces the shank in much the same manner as the flanges of an eye beam reinforces the beam but the tough central section of the shank guards against breakage while the hard land surface provides adequate wear characteristics.

I claim:
1. A combination drill shank and tip for rapid feed drilling of soft metal which comprises a shank portion having a widely spaced single flute, said flute forming a relatively wide rib having a single narrow land portion along one edge thereof raised above the remainder of the rib, the tip of said drill having a double flute formation, one flute of which merges with a flute of the shank and the other flute of which converges with the main flute of the shank, said drill having a pair of cutting edges extending to the circumference of the drill from the center point in substantially radial direction but off-set from the true radius of the drill, said cutting edges being relatively straight in plane parallel to the axis of the drill and having a smooth uninterrupted concave curvature transverse to the axis of the drill extending from the axis to the circumference, said curvature being approximately equal to the arc of a circle having a diameter equal to the diameter of the drill.

2. In a drill, a steel shank having throughout the greater part of its length a single wide flute in a widely spaced spiral along the shank creating a wide spiral rib on said shank, said rib having a narrow contact land along one edge raised above the rib surface, a double fluted cutting tip on said shank having one flute aligned spirally with the flute of said shank and the other flute merging with the first flute near the cutting tip, the cutting tip having cutting edges angled back from the center of the drill tip, said edges being relatively straight in end profile and in spaced planes respectively on either side of a plane containing the axis of the drill, said edges being concavely curved in side profile in a smooth, uninterrupted curve from the tip axis to the circumference of the tip.

3. A drill as defined in claim 2 in which the concavity of the curved edges is on a radius equal approximately to the diameter of the drill.

4. A drill as defined in claim 2 in which the land has a hardness about one-third greater than the shank on a Rockwell C scale.

5. A drill shank and tip for rapid feed drilling of soft metal which comprises a shank portion having a widely spiraled flute forming a wide spiral rib to strengthen the shank against torsion, and a tip on said shank having a plurality of cutting edges parallel to but spaced from diametrical planes of said tip, said cutting edges having a straight end profile and a concave side profile in a smooth uninterrupted curve extending from tip axis to circumference having a radius of about the diameter of the drill.

References Cited in the file of this patent
UNITED STATES PATENTS
2,912,887    Andreasson _____ Nov. 17, 1959
FOREIGN PATENTS
3,681    Great Britain _____ 1900